US012702158B2

(12) United States Patent
Guilchet et al.

(10) Patent No.: US 12,702,158 B2
(45) Date of Patent: Aug. 11, 2026

(54) FILTER FOR SMOKING OR VAPING ARTICLE COMPRISING A TWO-LAYER MATERIAL

(71) Applicant: Schweitzer-Mauduit International, Inc., Alpharetta, GA (US)

(72) Inventors: Patrick Guilchet, Spay (FR); Diane Raverdy-Lambert, LeMans (FR)

(73) Assignee: SWM Holdings US, LLC, Atlanta, GA (US)

( * ) Notice: Subject to any disclaimer, the term of this patent is extended or adjusted under 35 U.S.C. 154(b) by 553 days.

(21) Appl. No.: 17/988,180

(22) Filed: Nov. 16, 2022

(65) Prior Publication Data

US 2023/0148658 A1 May 18, 2023

(30) Foreign Application Priority Data

Nov. 16, 2021 (FR) ...................................... 2112092

(51) Int. Cl.

| | |
|---|---|
| ***A24D 3/08*** | (2006.01) |
| ***A24D 1/04*** | (2006.01) |
| ***A24D 3/02*** | (2006.01) |
| ***A24D 3/06*** | (2006.01) |
| ***A24D 3/17*** | (2020.01) |
| ***B32B 5/02*** | (2006.01) |
| ***B32B 29/02*** | (2006.01) |

(52) U.S. Cl.

CPC ............... *A24D 3/08* (2013.01); *A24D 1/045* (2013.01); *A24D 3/0204* (2013.01); *A24D 3/0229* (2013.01); *A24D 3/0254* (2013.01); *A24D 3/0287* (2013.01); *A24D 3/062* (2013.01); *A24D 3/068* (2013.01); *A24D 3/17* (2020.01); *B32B 5/022* (2013.01); *B32B 29/02* (2013.01); *B32B 2262/065* (2013.01); *B32B 2262/067* (2013.01); *B32B 2262/144* (2021.05); *B32B 2307/72* (2013.01); *B32B 2307/724* (2013.01); *B32B 2307/732* (2013.01)

(58) Field of Classification Search

CPC .................................. A24D 3/08; A24D 3/17
USPC ............................................................ 24/17
See application file for complete search history.

(56) References Cited

U.S. PATENT DOCUMENTS 4,878,507 A * 11/1989 Case ........................ A24D 1/02 131/365
4,976,858 A 12/1990 Kadoya
5,099,861 A * 3/1992 Clearman ............ A24B 15/165 131/194
5,348,027 A * 9/1994 Barnes ..................... A24D 1/22 131/194

FOREIGN PATENT DOCUMENTS

| | | | | |
|---|---|---|---|---|
| FR | 2009244 A1 | | 1/1970 | |
| FR | 2009247 A1 | | 1/1970 | |
| GB | 2525363 A | * | 10/2015 | ............... A24D 3/02 |
| JP | H08269859 A | | 10/1996 | |
| JP | 2005067190 A | | 3/2005 | |
| WO | WO2013179243 A2 | | 12/2013 | |
| WO | WO2019149742 A1 | | 8/2019 | |
| WO | WO-2022053625 A1 | * | 3/2022 | ............... D04H 1/58 |

OTHER PUBLICATIONS

French Search Report Corresponding to Application No. 2112092 on Jun. 23, 2022.

* cited by examiner

*Primary Examiner* — Melvin C. Mayes
(74) *Attorney, Agent, or Firm* — Dority & Manning, Inc.

(57) ABSTRACT

The invention provides a material which comprises a paper substrate and a nonwoven substrate having a low density which can be used as filter for a smoking or vaping article.

17 Claims, No Drawings

FILTER FOR SMOKING OR VAPING ARTICLE COMPRISING A TWO-LAYER MATERIAL

RELATED APPLICATIONS

The present application is based upon and claims priority to French Patent Application No. 2112092, having a filing date of Nov. 16, 2021, and which is incorporated herein by reference in its entirety.

TECHNICAL FIELD

The invention provides a filter comprising a biodegradable two-layer material, and comprising a paper substrate and a substrate capable of being obtained by an airlaid process or by a drylaid process. This filter can be used as filter for a smoking or vaping article.

PRIOR ART

A filter for a smoking or vaping article has a right circular cylindrical shape and generally comprises an outer envelope of plug wrap paper and a substrate located within the outer envelope. The filter for a smoking or vaping article, by virtue of the substrate, makes it possible to prevent the user from inhaling tobacco particles and allows retention of the harmful particulate substances contained in the smoke or the aerosol, such as tar.

Conventional filters are made from cellulose acetate. These conventional filters have a nicotine retention capacity such that the user's perception of the filtered smoke is satisfactory. In addition, these conventional filters generate a filtered smoke having good organoleptic properties. However, conventional filters degrade very slowly and are not dispersible in water. This is particularly harmful since the filter is not consumed during the smoking/vaping of a smoking or vaping article and is regularly found in the environment. Conventional filters thus have a significant environmental impact.

To limit the environmental impact of conventional filters, it has been proposed to replace the cellulose acetate with a paper substrate obtained by a wetlaid process. As these paper substrates are biodegradable, they degrade rapidly. However, the nicotine retention capacity of filters comprising such a paper substrate is such that the user's perception of the filtered smoke may not be satisfactory. In addition, the smoke filtered by filters comprising such a paper substrate may have a drying taste which is unsatisfactory for the user. The user experience provided by these paper substrates obtained by a wetlaid process is thus not as satisfactory when compared with filter made from cellulose acetate.

It has also been proposed to replace the cellulose acetate with a nonwoven substrate obtained by an airlaid process or by a drylaid process. A dispersible filter comprising a nonwoven substrate obtained by an airlaid process is described in FR 20 09244. A filter comprising a nonwoven substrate obtained by a drylaid process is described in FR 20 09247. The filters of these two patent applications have a nicotine retention capacity of the same order of magnitude as a conventional cellulose acetate filter.

However, these two nonwoven substrates cannot be crimped. This is a disadvantage since crimping the substrate is the easiest means, and thus the means most conventionally used, for controlling the pressure drop of the filters. To control the pressure drop of filters comprising these two nonwoven substrates, it is thus necessary to adapt the width of the two nonwoven substrates to modify the weight of the filtering material. However, it is a wish of manufacturers of filters for smoking or vaping articles for a substrate to be able to be easily adapted to the different filters manufactured, as is the case with the paper substrate which can be crimped to control the pressure drop of the filters without modifying the width. Furthermore, the mechanical properties of the filters of patent application FR 20 09247 can be unsatisfactory; in particular these filters are softer and are crushed more easily.

TECHNICAL PROBLEM

There is therefore a need for a substrate that is easily adaptable to different filters, which makes it possible to manufacture a filter having a nicotine retention capacity of the same order of magnitude as that of a cellulose acetate filter, which provides a satisfactory user experience and which has satisfactory mechanical properties.

It is thus to the credit of the inventors to have found that it was possible to meet this need by means of a two-layer material.

SUMMARY

Thus, a filter is proposed comprising a two-layer material comprising:

- a paper substrate having a density of between 500 mg/cm$^3$ and 200 mg/cm$^3$, in particular between 400 mg/cm$^3$ and 250 mg/cm$^3$, more particularly between 390 mg/cm$^3$ and 300 mg/cm$^3$, and
- a nonwoven substrate having a density of between 7 mg/cm$^3$ and 60 mg/cm$^3$, in particular between 8 mg/cm$^3$ and 55 mg/cm$^3$, more particularly between 10 mg/cm$^3$ and 45 mg/cm$^3$.

Advantageously, the filter of the invention has a nicotine retention capacity of the same order of magnitude as the retention capacity of a cellulose acetate filter. Moreover, the filter of the invention has a better nicotine retention capacity than the retention capacity of a filter comprising a paper substrate. Consequently, the users perception of the smoke filtered by the filter of the invention is satisfactory.

Moreover, the smoke filtered by the filter of the invention has organoleptic properties which are satisfactory for the user.

The two-layer material is moreover easily adaptable to different filters by modifying, for example, the density of the paper substrate by crimping.

The filter of the invention also has very satisfactory mechanical properties. In particular, it is more resistant to crushing than the filters of patent applications FR 20 09244 and FR 20 09247.

In addition, in contrast to a cellulose acetate filter, the filter of the invention may, by virtue of the composition of the two-layer material, degrade very rapidly in the environment. This is particularly advantageous, since the environmental impact of the filter of the invention is smaller than the environmental impact of a cellulose acetate filter.

According to another aspect, a process is proposed for producing a filter for a smoking or vaping article, comprising the following steps:

a) producing the paper substrate by a wetlaid process, b) optionally shaping the paper substrate produced in step a), c) producing the nonwoven substrate by a drylaid process or by an airlaid process, d) combining the paper substrate produced in step a) or b) and the nonwoven substrate produced in step c) to produce a two-layer material, e) forming a rod from the two-layer material produced in step d), f) wrapping the rod with a sheet of plug wrap paper, g) depositing an adhesive line at the junction of the sheet of plug wrap paper to obtain a rod of filtering material, h) cutting the rod of filtering material to produce the filter.

DESCRIPTION OF THE EMBODIMENTS

A filter is proposed comprising a two-layer material comprising: a paper substrate having a density of between 500 mg/cm$^3$ and 200 mg/cm$^3$, in particular between 400 mg/cm$^3$ and 250 mg/cm$^3$, more particularly between 390 mg/cm$^3$ and 300 mg/cm$^3$, and a nonwoven substrate having a density of between 7 mg/cm$^3$ and 60 mg/cm$^3$, in particular between 8 mg/cm$^3$ and 55 mg/cm$^3$, more particularly between 10 mg/cm$^3$ and 45 mg/cm$^3$.

Without wishing to be bound to any theory, the inventors are of the opinion that the low density of the nonwoven substrate allows the two-layer material to have a high filter filling power. This high filling power makes it possible to reduce the amount of two-layer material present in the filter of the invention such that the filter of the invention has a nicotine retention capacity of the same order of magnitude as the retention capacity of a cellulose acetate filter. At first glance, this reduction in the amount of two-layer material could alter the mechanical properties, in particular the resistance to crushing, of the filter of the invention. Surprisingly, this is not the case. Without wishing to be bound to any theory, the inventors are of the opinion that the filter of the invention has good mechanical properties, in particular a good resistance to crushing, by virtue of the high density of the paper substrate.

Thus, the combination of the high density of the paper substrate and the low density of the nonwoven substrate allows the filter of the present invention to exhibit a compromise between:

a satisfactory nicotine retention capacity, an adaptability during the manufacture of the filters, and satisfactory mechanical properties, in particular resistance to crushing.

For the purposes of the present application, "two-layer material" denotes a material in which the paper substrate forms a first layer, the nonwoven substrate forms a second layer and the first layer is in contact with the second layer.

For the purposes of the present application, "paper substrate" denotes a sheet consisting of wood fibres obtained by a wetlaid process.

The paper substrate of the two-layer material is a paper substrate conventionally used for manufacturing filters for smoking or vaping articles. The paper substrate of the two-layer material of the invention is capable of being obtained by a wetlaid process.

For the purposes of the present application, "nonwoven substrate" (also referred to as "nonwoven substrate") denotes a manufactured sheet consisting of a web or ply of directionally or randomly oriented fibres bonded together by friction and/or cohesion and/or adhesion. A nonwoven substrate may conventionally be obtained by a drylaid process or by an airlaid process. Thus, the nonwoven substrate of the two-layer material of the invention is capable of being obtained by a drylaid process or by an airlaid process.

Typically, the two-layer material can have a paper substrate:nonwoven substrate mass ratio of between 10:90 and 90:10, in particular between 75:25 to 25:75, more particularly between 45:55 and 55:45.

Typically, the density of the paper substrate is calculated by dividing its grammage by its thickness. The density of the nonwoven substrate is calculated in the same way.

The standard ISO 536:2012 can be used to determine the grammage of the paper substrate and of the nonwoven substrate. The substrate is conditioned for at least 16 hours at 23° C. and 50% humidity before the measurement.

To measure the thickness of the paper substrate and of the nonwoven substrate, it is possible to use a dead-weight micrometer comprising a 25 cm$^2$ measuring head with two planar, parallel and circular pressure faces. During the measurement, the substrate is placed between the two pressure faces for 10 seconds. The pressure exerted between the pressure faces during the measurement of the thickness is 0.5 kPa. The substrate is conditioned for at least 16 hours at 23° C. and 50% humidity before the measurement.

The grammage of the paper substrate can for example be between 20 g/m$^2$ and 60 g/m$^2$, in particular between 23 g/m$^2$ and 55 g/m$^2$, more particularly between 25 g/m$^2$ and 50 g/m$^2$.

The thickness of the paper substrate of the invention can for example be between 50 μm and 200 μm, in particular between 75 μm and 150 μm, more particularly between 90 μm and 130 μm.

According to one particular embodiment, the paper substrate has a density of between 350 mg/cm$^3$ and 360 mg/cm$^3$, and a thickness of between 100 μm and 110 μm.

The grammage of the nonwoven substrate of the invention can for example be between 20 g/m$^2$ and 65 g/m$^2$, in particular between 23 g/m$^2$ and 60 g/m$^2$, more particularly between 25 g/m$^2$ and 55 g/m$^2$.

The thickness of the nonwoven substrate of the invention can for example be between 700 μm and 6000 μm, in particular between 900 μm and 4700 μm, more particularly between 1000 μm and 4500 μm.

According to a first particular embodiment, the nonwoven substrate has a density of between 10 mg/cm$^3$ and 40 mg/cm$^3$, and a thickness of between 1000 μm and 2500 μm.

The drylaid process is particularly suitable for obtaining the nonwoven substrate of this first particular embodiment. Thus, the nonwoven substrate of this first particular embodiment can be obtained by a drylaid process.

According to a second particular embodiment, the nonwoven substrate has a density of between 20 mg/cm$^3$ and 45 mg/cm$^3$, and a thickness of between 1200 μm and 2500 μm.

The airlaid process is particularly suitable for obtaining the nonwoven substrate of this second particular embodiment. Thus, the nonwoven substrate of this second particular embodiment can be obtained by an airlaid process.

The person skilled in the art will know how to adapt the grammage and the thickness of the paper substrate and the nonwoven substrate in order to achieve the desired density.

According to one embodiment, the nonwoven substrate comprises natural fibres.

Typically, the natural fibres can represent between 70% and 99%, in particular between 80% and 98%, more particularly between 85% and 98% by weight of solids of said nonwoven substrate.

For the purposes of the present application, the term "natural fibre" denotes a fibre of natural origin which has optionally undergone a chemical treatment, a physical treatment, or both, in order to optimize the physical characteristics thereof.

For example, the natural fibres of the nonwoven substrate can be chosen from wood fibres, leaf fibres, fruit fibres, seed fibres, bast fibres, stalk fibres, reed fibres, and mixtures thereof, in particular wood fibres, leaf fibres, seed fibres, bast fibres, and mixtures thereof, more particularly wood fibres, bast fibres, and mixtures thereof.

Wood fibres present in the paper substrate and in the nonwoven substrate of the invention can be chosen from hardwood pulp, bleached hardwood pulp, softwood pulp, bleached softwood pulp, softwood fluff pulp, lyocell fibres (cellulose fibres which are ground and dissolved in N-methylmorpholine N-oxide monohydrate for the purpose of obtaining fibres with a cross section of variable shape (round, oval, cross-shaped, circular, lamellar cross section) with calibrated length and mass per unit length, which the person skilled in the art can choose depending on their needs), viscose fibres (fibres obtained by dissolving cellulose by means of modification of its hydroxyl groups by carbon disulfide ($CS_2$) and then precipitating it in the presence of sulfuric acid ($H_2SO_4$) for the purpose of obtaining fibres with a cross section of variable shape (round, oval, cross-shaped, circular, lamellar cross section) with calibrated length and mass per unit length, which the person skilled in the art can choose depending on their needs) and mixtures thereof, in particular hardwood pulp, softwood pulp, softwood fluff pulp, lyocell fibres, viscose fibres, and mixtures thereof, more particularly softwood pulp, softwood fluff pulp, lyocell fibres, and mixtures thereof.

For the purposes of the present application, "bast fibre" denotes a plant fibre contained in the bast of the plants.

The bast fibres can be chosen from hemp fibre, Indian hemp fibre, jute fibre, kenaf fibre, kudzu fibre, coin vine fibre, flax fibre, okra fibre, nettle fibre, papyrus fibre, ramie fibre, sisal fibre, esparto fibre and mixtures thereof, in particular hemp fibre, flax fibre, and mixtures thereof, more particularly flax fibre.

Typically, the bast fibres may have undergone prior treatment. Thus, the bast fibres can be cottonized bast fibres, individualized bast fibres, bast fibres which have undergone retting, bleached bast fibres and mixtures thereof, in particular cottonized bast fibres, individualized bast fibres and mixtures thereof.

For the purposes of the present application, "seed fibre" denotes a fibre obtained from seeds of a plant. The seed fibres can be chosen from cotton fibre, kapok fibre, luffa fibre, milkweed fibre, and mixtures thereof, in particular kapok fibre.

According to a first particular embodiment, the natural fibres are wood fibres chosen from softwood pulp, softwood fluff pulp, in particular softwood fluff pulp.

According to a second particular embodiment, the natural fibres are chosen from lyocell fibre, flax fibre, cottonized flax fibre, cotton fibre, and mixtures thereof, in particular a mixture of cottonized flax fibres and of lyocell fibres.

According to a third particular embodiment, the natural fibres of the nonwoven substrate are a mixture of natural fibres comprising cottonized flax fibres and lyocell fibres, the cottonized flax fibres represent more than 50%, in particular between 70% and 98%, more particularly between 85% and 95% by weight of solids of said mixture of fibres, and the lyocell fibres represent less than 50%, in particular between 2% and 30%, more particularly between 5% and 15% by weight of solids of said mixture of fibres.

Typically, the wood fibres of the paper substrate can have a length of between 1 mm and 3 mm, in particular between 1.5 mm and 2.7 mm, more particularly between 2 mm and 2.7 mm.

Typically, the natural fibres of the nonwoven substrate can have a length of between 1 mm and 150 mm, in particular between 1.5 mm and 100 mm, more particularly between 2 mm and 60 mm.

The length of the natural fibres can be measured by various techniques. For example, it can be measured with a Classifiber KCF-V/LS instrument from Keisokki. The natural fibres are combed and individualized before measurement. The length of the fibres is then measured automatically by an optical method using this instrument. The length can also be measured by microscopic measurement using a projection microscope by means of the necessary magnification. The person skilled in the art will know how to choose the measurement method suitable for the length of the natural fibres.

According to one particular embodiment, the natural fibres of the nonwoven substrate have a length of between 10 mm and 150 mm, in particular between 15 mm and 100 mm, more particularly between 20 mm and 60 mm.

A drylaid process is particularly suitable for this size of natural fibres. Thus, the nonwoven substrate of this particular embodiment can be obtained by a drylaid process.

According another particular embodiment, the natural fibres have a length of between 1 mm and 10 mm, in particular between 1.5 mm and 8 mm, more particularly between 2 mm and 5 mm.

An airlaid process is particularly suitable for these sizes of natural fibres. Thus, the nonwoven substrate of this other particular embodiment can be obtained by an airlaid process.

The natural fibres may also be cut so as to have a length within the ranges mentioned above. Conventional cutting techniques which can be used are guillotine cutting of natural fibres, and grinding of the natural fibres with or without an air cyclone or screen system for removing excessively short and excessively long fibres.

The nonwoven substrate can be consolidated by chemical consolidation, by needling, by hydroentanglement, or combinations thereof, in particular by chemical consolidation. These consolidation techniques are known to the person skilled in the art, who will know how to adapt them to the nonwoven substrate of the invention.

Chemical consolidation employs a binder. Thus, the nonwoven substrate may comprise a binder.

For the purposes of the present application, "binder" denotes a compound having properties enabling consolidation of the nonwoven substrate.

The binders conventionally used for consolidating conventional nonwoven substrates are suitable for the consolidation of the nonwoven substrate of the invention. Among these binders, a water-soluble binder will advantageously be chosen. Water-soluble is understood to refer to the ability of the binder to dissolve in water at a temperature and with stirring which are controlled, to form a homogeneous solution at ambient temperature and not a suspension. Advantageously, the nonwoven substrate is dispersible because the binder is water-soluble.

For example, the binder can be a natural polymer, a synthetic polymer or copolymer, or a mixture thereof.

The natural polymer can be a polysaccharide, a cellulose derivative, or a mixture thereof.

The polysaccharide which can be used as binder can be a polysaccharide as such or a derivative thereof. Starch, dextrin, gum arabic, or mixtures thereof, in particular starch, are polysaccharides that can be used as binder.

The cellulose derivative can be chosen from ethylcellulose, methylcellulose, hydroxymethylcellulose, hydroxyethylcellulose, carboxymethylcellulose, an alkali metal salt of carboxymethylcellulose and mixtures thereof, in particular carboxymethylcellulose.

As alkali metal of the carboxymethylcellulose salt, mention may be made of potassium, sodium, and magnesium.

The synthetic polymer or copolymer can for example be a polyvinyl alcohol, an ethylene vinyl alcohol, a polyvinyl acetate, a polyvinyl chloride, a styrene-butadiene, a polybutadiene, a polyacrylic, an ethylene-vinyl acetate, or mixtures thereof, in particular polyvinyl alcohol.

Typically, the binder can represent between 1% and 30%, in particular between 2% and 20%, more particularly between 2% and 15% by weight of solids of said nonwoven substrate.

According to a more particular embodiment, the nonwoven substrate has a density of between 10 mg/cm$^3$ and 40 mg/cm$^3$ and comprises:

- a mixture of fibres comprising between 85% and 95% of cottonized flax fibres by weight of solids of said mixture of fibres and between 5% and 15% of lyocell fibres by weight of solids of said mixture of fibres, and
- a binder, in particular starch, in which the mixture of fibres represents between 90% and 98% by weight of solids of said nonwoven substrate and the binder represents between 2% and 10% by weight of solids of said nonwoven substrate.

The nonwoven substrate of this more particular embodiment can be obtained by a drylaid process.

According to another more particular embodiment, the nonwoven substrate has a density of between 20 mg/cm$^3$ and 45 mg/cm$^3$ and comprises:

- softwood fluff pulp, and
- a binder, in particular starch, in which the softwood fluff pulp represents between 80% and 95% by weight of solids of said nonwoven substrate and the binder represents between 5% and 20% by weight of solids of said nonwoven substrate.

The nonwoven substrate of this other more particular embodiment can be obtained by an airlaid process.

The paper substrate of the two-layer material of the invention can be shaped; in particular, it can be crimped. This shaping can make it possible to modify the properties of the paper substrate and therefore the properties of the filter comprising the two-layer material of the invention. For example, crimping can make it possible to modify the density of the paper substrate, and therefore the density of the two-layer material, and thus to increase or reduce the pressure drop of the filter comprising the two-layer material of the invention without changing the weight of the filter. In this way, the shaping of the paper substrate by known processes such as crimping renders the two-layer material easily adaptable to different filters.

The two-layer material of the filter of the invention can be combined with another substrate or other substrates. This or these other substrates may, independently of one another, be a paper substrate or a nonwoven substrate. The paper substrate may be the paper substrate of the invention. The nonwoven substrate may be the nonwoven substrate of the invention.

According to one embodiment, the filter can be a filter for a smoking or vaping article comprising a two-layer material of the invention as defined above.

For the purposes of the present application, "smoking article" denotes an article comprising tobacco and/or any other plant intended to be smoked. For example, the smoking article may be a machine-manufactured cigarette, a roll-your-own cigarette or a make-your-own cigarette.

Typically, the filter for a smoking article has a right circular cylindrical shape and comprises an outer envelope of plug wrap paper for a smoking article, in particular for a cigarette, and the two-layer material of the invention as defined above located within the outer envelope.

For the purposes of the present application, "vaping article" denotes an article comprising tobacco and/or any other plant intended to be vaped, which is intended to be inserted into a device which heats the tobacco and/or the plant without burning said tobacco/plant and which enables delivery of an aerosol to a user. For example, the vaping article can be a tobacco stick.

Typically, the filter for a vaping article has a right circular cylindrical shape and comprises an outer envelope of plug wrap paper for a vaping article, in particular for a tobacco stick, and the two-layer material of the invention as defined above located within the outer envelope.

The filter of the invention can have a density of between 100 mg/cm$^3$ and 300 mg/cm$^3$, in particular between 150 mg/cm$^3$ and 250 mg/cm$^3$, more particularly between 140 mg/cm$^3$ and 200 mg/cm$^3$.

Typically, the density of the filter is measured after manufacture of the filters, by dividing the mass of the filter by its volume. Fora filter having a right circular cylindrical shape, the volume of the filter ($V_{filter}$) is calculated by the following formula: $V_{filter}=\pi*L*r^2$, in which r denotes the radius of the filter and L denotes the length of the filter.

The density of the filter of the invention is greater than the density of the filters of applications FR 20 09244 and FR 20 09247. Without wishing to be bound to any theory, the inventors are of the opinion that the mechanical properties of the filter, in particular its resistance to crushing, are due to the higher density of the filter of the invention.

According to another aspect, the present invention also relates to a smoking article comprising a filter as defined above.

According to another aspect, the present invention also relates to a vaping article comprising a filter as defined above.

The present invention also relates to the use of a two-layer material as defined above in a filter, in particular a filter for a smoking article or a filter for a vaping article.

The present invention also relates to a process for producing a filter for a smoking or vaping article as defined above, said process comprising the following steps:

a) producing the paper substrate by a wetlaid process,
b) optionally shaping the paper substrate produced in step a),
c) producing the nonwoven substrate by a drylaid process or by an airlaid process,
d) combining the paper substrate produced in step a) or b) and the nonwoven substrate produced in step c) to produce a two-layer material,
e) forming a rod from the two-layer material produced in step d),
f) wrapping the rod with a sheet of plug wrap paper,
g) depositing an adhesive line at the junction of the sheet of plug wrap paper to obtain a rod of filtering material, and
h) cutting the rod of filtering material to produce the filter.

Typically, the filter for a smoking or vaping article produced by the production process of the invention can have a right circular cylindrical shape and can comprise:

- an outer envelope of plug wrap paper for a filter for a smoking or vaping article, and
- the two-layer material as defined above located within the outer envelope.

The paper substrate and the nonwoven substrate are as defined above.

The wetlaid process for producing a paper substrate is a conventional process known to the person skilled in the art. The person skilled in the art will know how to adapt the parameters of this process to produce the paper substrate of the two-layer material of the invention.

The airlaid process and the drylaid process for producing a nonwoven substrate are conventional processes known to the person skilled in the art. The person skilled in the art will know how to adapt the parameters of these processes to produce the nonwoven substrate of the two-layer material of the invention.

The natural fibres of the nonwoven substrate can be a mixture of natural fibres. This mixture of natural fibres can be obtained before production step c).

The process of the invention can if needed comprise, before production step c), a step of cutting the natural fibres of the nonwoven substrate to obtain natural fibres having a length within the ranges mentioned above. The cutting step can be carried out by conventional techniques such as guillotine cutting, and grinding of the natural fibres with or without an air cyclone or screen system for removing excessively short and excessively long fibres.

The natural fibres can be bast fibres which have undergone a prior treatment, such as cottonized bast fibres, individualized bast fibres, bast fibres which have undergone retting or mixtures thereof, in particular cottonized bast fibres, individualized bast fibres or mixtures thereof.

Thus, the process of the invention can comprise, prior to production step c), a step of treating the bast fibres chosen from retting, bleaching, cottonization, individualization, and a mixture thereof, in particular cottonization, individualization, or individualization followed by cottonization.

Cottonization is a known treatment in which the fibres are attenuated in order to pass through cotton spinning mills. The person skilled in the art will know how to implement a cottonization treatment step.

Individualization is a treatment in which all or some of the fibres of a set of fibres are separated from each other. Individualization may, for example, be carried out by combing or by a chemical treatment.

This treatment step can be performed before, after, or before and after the cutting step.

The paper substrate produced in step a) can be shaped during step b). This shaping may be a crimping, an embossing, a folding, a compression transverse to the cylindrical axis of a filter for a smoking or vaping article, or combinations thereof.

Combination step d) can be any type of step known to the person skilled in the art for combining two substrates. This step d) can be the deposition of one substrate onto the other, the lamination of the two substrates, or the adhesive bonding of the two substrates.

According to a more particular embodiment, the process comprises the following steps:

- a) producing the paper substrate by a wetlaid process,
- b) optionally shaping the paper substrate produced in step a),
- c11) producing a web by a drylaid process from a mixture of natural fibres comprising between 85% and 95% of cottonized flax fibres by weight of solids of said mixture of fibres and between 5% and 15% of lyocell fibres by weight of solids of said mixture of fibres,
- c21) introducing binder, in particular starch, into the web by spraying an aqueous dispersion of binder,
- c31) drying the web obtained from step c21) to obtain a nonwoven substrate having a density of between 10 mg/cm$^3$ and 40 mg/cm$^3$ and in which the mixture of fibres represents between 85% and 98% by weight of solids of said nonwoven substrate and the binder represents between 2% and 15% by weight of solids of said nonwoven substrate,
- d) combining the paper substrate produced in step a) or b) and the nonwoven substrate produced in step c31) to produce the two-layer material,
- e) forming a rod from the two-layer material produced in step d),
- f) wrapping the rod with a sheet of plug wrap paper,
- g) depositing an adhesive line at the junction of the sheet of plug wrap paper to obtain a rod of filtering material, and
- h) cutting the rod of filtering material to produce the filter.

According to another more particular embodiment, the process comprises the following steps:

- a) producing the paper substrate by a wetlaid process,
- b) optionally shaping the paper substrate produced in step a),
- c12) producing a web by an airlaid process from softwood fluff pulp,
- c22) introducing binder, in particular starch, into the web by spraying an aqueous dispersion of binder,
- c32) drying the web obtained from step c22) to obtain a nonwoven substrate having a density of between 20 mg/cm$^3$ and 45 mg/cm$^3$ and in which the softwood fluff pulp represents between 85% and 95% by weight of solids of said nonwoven substrate and the binder represents between 5% and 15% by weight of solids of said nonwoven substrate,
- d) combining the paper substrate produced in step a) or b) and the nonwoven substrate produced in step c32) to produce the two-layer material,
- e) forming a rod from the two-layer material produced in step d),
- f) wrapping the rod with a sheet of plug wrap paper,
- g) depositing an adhesive line at the junction of the sheet of plug wrap paper to obtain a rod of filtering material, and
- h) cutting the rod of filtering material to produce the filter.

Introduction step c21) or c22) may for example be carried out by impregnation, such as impregnation with a size press, by spraying, such as spraying using a spray, by surface application, such as surface application by coating or by printing, in particular by spraying a spray. Advantageously, the spraying will be performed on both faces of the web.

The aqueous dispersion of the binder can be obtained by any technique known to the person skilled in the art. The person skilled in the art will know how to adapt the concentration of binder in the aqueous dispersion to obtain the desired content of binder in the nonwoven substrate of the invention.

Drying step c31) or c32) can, for example, be carried out by a drying device, such as a tunnel through which air passes or an infrared lamp.

This drying step c31) or c32) can be carried out at a temperature of between 75° C. and 200° C., in particular between 90° C. and 150° C., more particularly between 100° C. and 120° C. A temperature within these ranges advantageously makes it possible to minimize the duration of this drying step cc31) or c32) while at the same time minimizing the deterioration of the natural fibres of the nonwoven substrate, thus optimizing the process of the invention.

Advantageously, the combination of the steps c21) and c31), or c22) and c32), makes it possible to improve the cohesion of the natural fibres and hence to consolidate the structure of the nonwoven substrate of the two-layer material of the invention.

Production step c) of the process of the invention can comprise, in particular between steps c11) and c21), between steps c21) and c31), between steps c12) and c22) or between steps c22) and c32), a step of compacting the web to obtain a compacted web, this compacted web then undergoing step c21) or c22). This compacting step can make it possible to reduce the thickness of the web in order to control the density of the nonwoven substrate.

EXAMPLES

Example 1

Manufacture of a Two-Layer Material

Example 1.1

Two-Layer Material Comprising a Paper Substrate and a Nonwoven Substrate Prepared by an Airlaid Process The paper substrate is produced by a wetlaid process. It has a density of 356 mg/cm$^3$, a thickness of 101 μm and a grammage of 36 g/m$^2$.

A web was formed by an airlaid process from softwood fluff pulp. A solution comprising 0.7% solids content of starch (Perfectafilm X115 manufactured by Avebe) is sprayed onto both sides of the web. The sprayed web is then dried by infrared and hot air oven at a temperature of between 180° C. and 190° C.

The nonwoven substrate obtained comprises 85% by weight of solids of said nonwoven substrate of softwood fluff pulp and 15% by weight of solids of said nonwoven substrate of starch. The nonwoven substrate obtained has a density of 24 mg/cm$^3$, a thickness of 1910 μm and a grammage of 46 g/m$^2$.

The paper substrate was crimped and is then deposited on the nonwoven substrate to produce the two-layer material having a paper substrate:nonwoven substrate mass ratio of 50:50.

Example 1.2

Two-Layer Material Comprising a Paper Substrate and a Nonwoven Substrate Prepared by a Drylaid Process The paper substrate is that of Example 1.1.

A web was prepared by a dry laid process from cottonized flax fibres (VERVAEKE FIBRE NV, 22 mm in length) and lyocell fibres (1.7 dtex/38 mm in length from LENZIG). The cottonized flax fibers and the lyocell fibers were mixed, opened and parallelized with a card before being deposited on a web forming fabric. A solution comprising 5% solids content of starch (Perfectafilm X115 manufactured by AVEBE) is sprayed onto both sides of the web. The sprayed web is then dried by hot air oven at a temperature of between 100° C. and 120° C.

The nonwoven substrate obtained comprises 92% by weight of solids of said nonwoven substrate of the mixture of cottonized flax fibres and lyocell fibres (90% cottonized flax/10% lyocell by weight of solids of the mixture of fibres) and 8% by weight of solids of said nonwoven substrate of starch. The nonwoven substrate obtained has a density of 12 mg/cm$^3$, a thickness of 2140 μm and a grammage of 26.2 g/m$^2$.

The paper substrate is crimped and is then deposited on the nonwoven substrate to produce the two-layer material having a paper substrate:nonwoven substrate mass ratio of 50:50.

Example 2

Manufacture and Characterization of Filters for a Smoking Article

Filters for a smoking article were manufactured with the substrates of Examples 1.1 and 1.2 by a standard method for manufacturing filters. A nonporous plug wrap paper was used to wrap the rods of filtering material.

The filters of the invention were compared with a filter comprising the nonwoven substrate of Example 1.1, with a filter comprising the nonwoven substrate of Example 1.2, with a paper filter and with a commercial cellulose acetate filter.

The crimped paper filter was made using a standard method for manufacturing filters by crimping the paper substrate of Example 1.1.

The filters obtained for each term were cut into 21-mm sticks.

The characteristics of the filters are presented in Table 1 below.

The resistance to crushing is determined using a DHT 200 instrument from Filtrona. During a measurement, the filter is crushed with a weight of 300 g for 15 seconds. The amount of crushing in millimetres is measured electronically.

TABLE 1

| | Filter comprising the two-layer material of Example 1-1 | Filter comprising the two-layer material of Example 1-2 | Filter comprising the nonwoven substrate of Example 1-1 | Filter comprising the nonwoven substrate of Example 1-2 | Commercial cellulose acetate filter | Crimped paper filter |
|---|---|---|---|---|---|---|
| Length of the filters [mm] | | | 21 | | | |
| Diameter of the filters [mm] | | | 7.8 | | | |

TABLE 1-continued

| | Filter comprising the two-layer material of Example 1-1 | Filter comprising the two-layer material of Example 1-2 | Filter comprising the nonwoven substrate of Example 1-1 | Filter comprising the nonwoven substrate of Example 1-2 | Commercial cellulose acetate filter | Crimped paper filter |
|---|---|---|---|---|---|---|
| Weight of the filters [mg] | 194 | 198 | 149 | 148 | 140 | 233 |
| Density of the filters [mg/cm$^3$] | 193 | 198 | 146 | 145 | 138 | 238 |
| Crushing (mm) | 0.40 | 0.725 | 0.48 | 1 | Not determined | 0.44 |

According to Table 1, the filters comprising the two-layer material of the invention have a better resistance to crushing than the filters comprising only the nonwoven substrate. This demonstrates that the combination of the paper substrate with the nonwoven substrate obtained by a drylaid process makes it possible to obtain an improvement in the resistance to crushing of the filter comprising only the nonwoven substrate obtained by a drylaid process.

Example 3

Manufacture and Characterization of Cigarettes

Cigarettes were prepared using the filters described in Example 2. To form the cigarettes, the rods of tobacco were assembled with the filters using tipping paper. A commercial "American blend" tobacco was used to form the rods of tobacco. The cigarettes were prepared with a pressure drop similar to that of the commercial cigarette. The ventilation of the cigarettes was blocked.

The cigarettes prepared were smoked on a Borgwaldt RM20 smoking machine in accordance with the standard ISO 3308:2000. The pressure drop ("PD" in Table 2) was measured in accordance with the standard 6565:2002. The nicotine content in the smoke was measured in accordance with the standard ISO 10315:2000. The smoking results are presented in Table 2 below.

TABLE 2

| | Cigarette with filter comprising the two-layer material of Example 1-1 | Cigarette with filter comprising the two-layer material of Example 1-2 | Cigarette with filter comprising the nonwoven substrate of Example 1-1 | Cigarette with filter comprising the nonwoven substrate of Example 1-2 | Cigarette with commercial cellulose acetate filter | Cigarette with crimped paper filter |
|---|---|---|---|---|---|---|
| Numberof cigarettes smoked | | | | 30 | | |
| PD of the cigarettes [mmWC] | 94 | 104 | 101 | 90 | 100 | 100 |
| Nicotine retention [%] | 51 | 51 | 45 | 45 | 37 | 66 |

Table 2 demonstrates that, at an equivalent pressure drop, the nicotine content in the smoke produced by the cigarettes with the filters comprising the two-layer material according to the invention, the cigarettes comprising a commercial cellulose acetate filter and the cigarettes comprising a filter comprising a nonwoven substrate, is of the same order of magnitude. Specifically, the filter of these cigarettes exhibits a nicotine retention of the same order of magnitude.

Table 2 also demonstrates that, at an equivalent pressure drop, the nicotine content in the smoke produced by the cigarettes comprising the crimped paper filter is much lower than the nicotine content in the smoke produced by the cigarettes comprising a commercial cellulose acetate filter. Specifically, the crimped paper filter exhibits a nicotine retention that is much greater than the commercial cellulose acetate filter.

This Example 3 thus demonstrates that the user experience provided by the cigarettes comprising the filters comprising the two-layer material according to the invention is close to that provided by cigarettes comprising a commercial cellulose acetate filter.

The invention claimed is:

1. A filter comprising a two-layer material comprising:

a paper substrate having a density of between 500 mg/cm$^3$ and 200 mg/cm$^3$, and a nonwoven substrate having a density of between 7 mg/cm$^3$ and 60 mg/cm$^3$, wherein the paper substrate forms a first layer, the nonwoven substrate forms a second layer, and the first layer is in contact with the second layer.

2. The filter according to claim 1, wherein the paper substrate to nonwoven substrate mass ratio is between 10:90 and 90:10.

3. The filter according to claim 1, wherein the paper substrate has a thickness of between 50 μm and 200 μm.

4. The filter according to claim 1, wherein the nonwoven substrate has a thickness of between 700 μm and 6000 μm.

5. The filter according to claim 1, wherein the nonwoven substrate comprises natural fibres chosen from wood fibres, leaf fibres, fruit fibres, seed fibres, bast fibres, stalk fibres, reed fibres, and mixtures thereof.

6. The filter according to claim 1, wherein the nonwoven substrate is consolidated by chemical consolidation, by needling, by hydroentanglement, or combinations thereof.

7. The filter according to claim 1, wherein the nonwoven substrate is capable of being obtained by a drylaid process or by an airlaid process.

8. The filter according to claim 1 for a smoking or vaping article.

9. A smoking article comprising a filter as defined in claim 8.

10. A vaping article comprising a filter as defined in claim 8.

11. A process for producing a filter for a smoking or vaping article as defined in claim 8, said process comprising the following steps:

a) producing the paper substrate by a wetlaid process, b) optionally shaping the paper substrate produced in step a), c) producing the nonwoven substrate by a drylaid process or by an airlaid process, d) combining the paper substrate produced in step a) or b) and the nonwoven substrate produced in step c) to produce a two-layer material, e) forming a rod from the two-layer material produced in step d), f) wrapping the rod with a sheet of plug wrap paper, g) depositing an adhesive line at the junction of the sheet of plug wrap paper to obtain a rod of filtering material, h) cutting the rod of filtering material to produce the filter.

12. The filter according to claim 1, wherein the paper substrate has a density of between 400 $mg/cm^3$ and 250 $mg/cm^3$ and the nonwoven substrate has a density of between 8 $mg/cm^3$ and 55 $mg/cm^3$.

13. The filter according to claim 1, wherein the paper substrate to nonwoven substrate mass ratio is between 75:25 and 25:75.

14. The filter according to claim 1, wherein the paper substrate has a thickness of between 75 μm and 150 μm.

15. The filter according to claim 1, wherein the nonwoven substrate has a thickness of between 900 μm and 4700 μm.

16. The filter according to claim 1, wherein the nonwoven substrate is obtained by a drylaid process.

17. The filter according to claim 1, wherein the nonwoven substrate is obtained by an airlaid process.

* * * * *